THIN FILM MEMORY DEVICE EMPLOYING UNIPOLAR BILEVEL WRITE-READ PULSES TO MINIMIZE CREEP

Filed Sept. 1, 1964

INVENTOR
ALEXANDER TURCZYN

BY

ATTORNEY

United States Patent Office 3,422,408

Patented Jan. 14, 1969

3,422,408

THIN FILM MEMORY DEVICE EMPLOYING UNIPOLAR BILEVEL WRITE-READ PULSES TO MINIMIZE CREEP

Alexander Turczyn, Philadelphia, Pa., assignor to Sperry Rand Corporation, New York, N.Y., a corporation of Delaware Filed Sept. 1, 1964, Ser. No. 393,498

U.S. Cl. 340—174 5 Claims

Int. Cl. G11b 5/00

ABSTRACT OF THE DISCLOSURE

The invention relates to a technique for minimizing creep or magnetic domain wall motion in a continuously coated wire memory device. This is accomplished by energizing the drive line juxtaposed to the wire memory with a unipolar signal having a smaller amplitude during the write cycle than during the read cycle. This minimizes the possibility of exceeding the film's wall motion threshold.

This invention relates in general to the reading and recording of information on a magnetic storage element. In particular, this invention relates to the reading and recording of information on a plated wire memory element.

It has been observed during the recording cycle of a plated wire memory device that a transverse field emanating from a drive line in combination with a digit field produced by a bit line causes an effect known as "interbit creep." Interbit creep is defined as the gradual elongation of a magnetized section on a recording medium occurring during the recording cycle so that information stored in adjacent positions is destroyed or altered. The phenomenon of interbit creep in a plated wire memory device therefore causes incorrect information to be introduced into the arithmetic registers of a digital computer so that erroneous computations are made.

It is therefore an object of this invention to provide an improved data storage device.

It is also an object of this invention to provide an improved plated wire memory device.

It is yet another object of this invention to provide a technique that minimizes the effect of interbit creep in plated magnetic wires.

It is still another object of this invention to provide a memory device that achieves high packing density.

It is also another object of this invention to provide a memory device having an improved read-write technique.

In accordance with a feature of this invention there is provided a magnetic, thin film, plated wire storage device wherein the orthogonally positioned drive line to the plated wire is energized with a shaped current pulse during the read and write cycles. The shaped current pulse, which is applied to the drive line, is designed to have a leading edge whose amplitude is substantially greater than the amplitude of its trailing edge. The higher amplitude leading edge is utilized to read out information stored in the memory element during a memory read cycle, whereas the low amplitude trailing edge is utilized in conjunction with a positive or negative polarity bit current pulse applied to the plated wire to record either a binary "one" or "zero" during a memory write cycle. The shaped current pulse as above described and applied by the word driver includes the low amplitude portion in order to restrict the spreading of the traverse field during the recording cycle so that the effect of creep is minimized or virtually eliminated.

The novel features that are considered characteristic of this invention are set forth with particularity in the appended claims, the invention itself, however, both as to its organization and method of operation, as well as additional objects and features thereof, will best be understood from the following description when considered in conjunction with the accompanying drawings, wherein:

Figure 1:
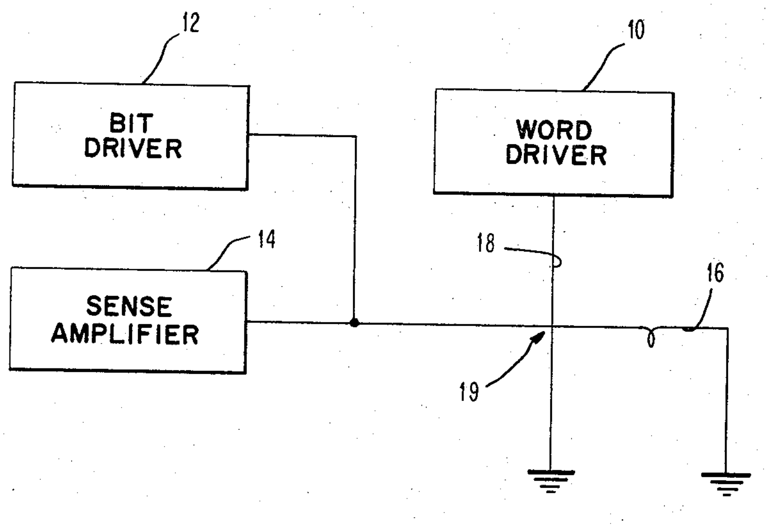
FIGURE 1 is a block diagram of the circuitry to be utilized in the instant invention.

Referring now to the drawings, and in particular to FIGURE 1, the plated wire 16 is shown common connected to the bit driver 12 and the sense amplifier 14. The plated wire 16, in a preferred embodiment, is a five mil diameter beryllium-copper wire substrate having a thin, magnetic film formed on the surface thereof. The thin magnetic film formed on the surface thereof is electroplated on the wire substrate with approximately a 10,000 Angstrom thickness of Permalloy (i.e. nickel-iron alloy). In a preferred embodiment, the Permalloy film is approximately 80% nickel and 20% iron. The Permalloy film when electroplated in the presence of a circumferential magnetic field establishes a uniaxial anisotropy axis at right angles (i.e. around the circumference) to the longitudinal axis of the wire along its length. The uniaxial anisotropy establishes an "easy" and "hard" direction of magnetization and the magnetization vectors formed thereby are normally oriented in one of two equilibrium positions along the "easy" axis, thereby establishing two bistable states necessary for binary logic operation. In other words, the two equilibrium positions along the "easy" axis comprise two states of remanence which are representative of first and second recorded signals. One end of the plated wire is returned to the bit driver 12 and the sense amplifier 14 by means of the ground connection, thereby establishing a continuous circuit path.

Placed substantially perpendicular and in juxtaposition to the plated wire 16 is the drive line 18. The intersection 19 of the plated wire 16 and the drive line 18 determine a memory bit position or storage cell. It should be noted that it is not necessary that the drive line 18 be exactly perpendicular to the plated wire 16 and hence, they may be skewed somewhat without seriously degrading performance. Although FIGURE 1 depicts only a single plated wire 16, and a single drive line 18, in a perferred embodiment there would be a plurality of both. The number of plated wires under a drive line determines the number of bits per memory word and the number of words determines the size of the memory. Depending upon the packing density required, as well as the size of the memory, there may be as many as 25 to 50 plated wires per inch. The drive element 18 has a typical width dimension of 20 mils and is depicted in FIGURE 1 as being straight, one end of which is grounded. It should be understood however that other forms of the drive line may be used as, for example, it may have a single or multi-turn configuration in order to achieve closer coupling with the plated wire 16.

In a normal plated wire memory embodiment, the plated wire 16 also serves as a sense line which is connected to the sense amplifier 14. As is understood in the art, a sense amplifier is utilized to interpret information stored in the plated wire memory device after it has been read-out of the memory as described in greater detail below.

Figure 2:
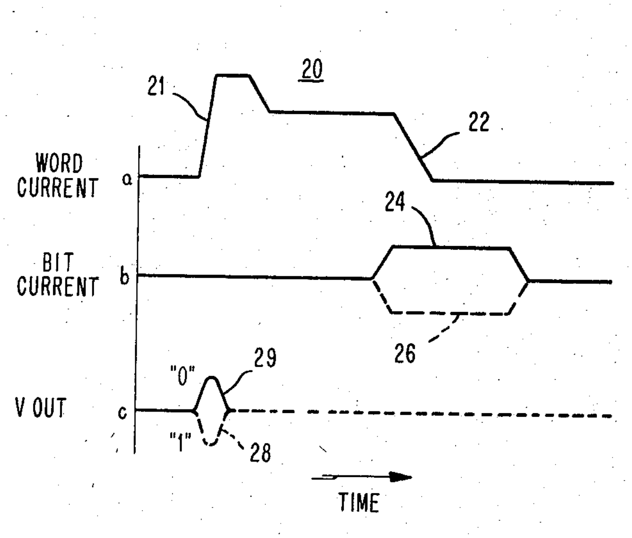
FIGURE 2 depicts the current waveforms produced by the circuit arrangement of FIGURE 1 in time relationship.

In order to read-out information stored at the bit position 19, the drive line 18 is energized by the word driver 10. In accordance with this invention, the drive line 18 is energized by a shaped current pulse 20 and is depicted in FIGURE 2 and in particular FIGURE 2*a*. FIGURE 2*a* reveals a shaped current pulse 20 wherein the amplitude of the pulse at its rise time 21 is substantially greater than the amplitude of the same pulse at its fall time 22. In accordance with this invention, the high amplitude portion 21 of the pulse 20 is utilized for memory read-out purposes. As is understood in the art, when the drive line 18 is energized by the word driver 10 during a memory read cycle it causes the magnetization vectors at the required bit position 19 which are oriented in one of two equilibrium positions along the "easy" axis to be rotated toward the "hard" axis of magnetization at some angle less than 90 degrees. This rotation of the magnetization vectors induces a voltage in the plated wire 16 which is detected by the sense amplifier 14. The signal induced in the plated wire 16 is either positive or negative in accordance with the particular orientation of the vectors (prior to the rotation) along the "easy" axis. The induced voltages are shown in FIGURE 2*c* and the positive polarity signal 29 indicates that a binary "one" is stored in the bit position 19; similarly, the negative polarity signal 28 indicates that a binary "zero" is stored therein.

In order to write new information (i.e., either a binary "zero" or "one") into the bit position 19 of the plated wire memory device disclosed in FIGURE 1, it is necessary that current be supplied to the drive line 18 by means of the word driver 10 and simultaneously, bit current of the proper polarity be supplied to the plated wire 16 by means of the bit driver 12. As is understood in the art, the current flowing in the drive line 18 is necessary to rotate the magnetization vectors along the "easy" axis toward some angle less than 90 degrees. The presence of the bit current from the bit driver 12 steers (i.e. adds the necessary additional movement) the magnetization vectors toward desired "easy" axis orientation. After all bit and drive current is removed, the magnetization vectors relax to their rest or equilibrium position along the "easy" axis.

Relating the above description to FIGURE 2, the shaped word current pulse applied by the word driver 10 to the drive line 18 is shown in FIGURE 2*a* and the steering current applied by the bit driver 12 is depicted in FIGURE 2*b*. It is apparent by comparing FIGURES 2*a* and 2*b* that the positive steering pulse 24 and the negative steering pulse 26 are in substantial time coincidence with the lagging edge 22 of the word current pulse 20.

It should also be noted that the amplitude of the trailing edge 22 of the word current pulse 20 applied to the drive line 18 during a write cycle is considerably lower than the word pulse 20 at its leading edge 21. This is an important feature of the instant invention in that the leakage magnetic field emanating from the drive line 18 during a write cycle is reduced by means of the above-mentioned expedient and hence, the leakage magnetic field does not as readily disturb adjacent bit positions of the bit position 19.

Thus, if we imagine that there are bit positions on either side of the bit position 19 it has been determined that the leakage field from the drive line 18 in combination with the steering field produced by the bit driver 12 can cause an eventual alteration of the information stored in these adjacent bit positions by the re-recording of the same information in bit position 19. In some cases, such alteration may require millions of cycles or more. In other words, if the bit position 19 has a "one" re-recorded therein many times, and the adjacent bit positions store "zeros," the field produced by the drive line 18 in conjunction with the steering field may cause the adjacent bit positions to be switched into a "one" thereby producing an error in the memory. Reduction of the transverse field from the drive line 18 thereby prevents or greatly minimizes rotation of some of the magnetization vectors of the adjacent bit positions (i.e., the bit positions magnetized as "zeros"). When one or several of the magnetization vectors of the adjacent bits (zeros) are switched into "one's," the bit position 19 is considered to grow in length or creep, thereby eventually destroying the information stored in the adjacent bit positions.

Figure 3:
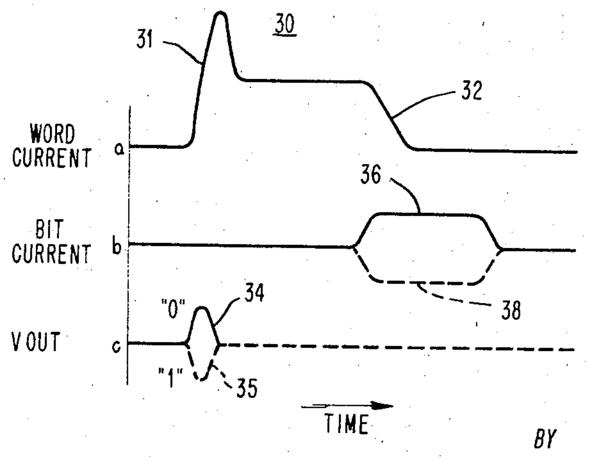
FIGURE 3 depicts current waveforms which are similar to those of FIGURE 2.

The waveform of FIGURE 2*a* can be provided by a current pulse having an overshoot at the leading edge as depicted in FIGURE 3*a*. The spike at the leading edge can be produced by conventional techniques incorporating peaking circuitry. The shaped current pulse 30 of FIGURE 3*a* depicts the higher amplitude spike occurring at the leading edge 31 for a memory read cycle and similarly demonstrates the lower amplitude portion occurring at the trailing edge 32 for a memory write cycle. The positive and negative read out signals 34 and 35, respectively, detected by the sense amplifier 14 (FIG. 1) and corresponding to a binary "zero" and "one" are shown in FIGURE 3*c* and in time relationship with the high amplitude spike 31 of the word current pulse 30. In FIGURE 3*b*, the positive pulse 36 or negative pulse 38, are applied by the bit driver 12 (FIGURE 1) to the plated wire in substantial time coincidence with the trailing edge 32 of the word pulse 30 in order to record a binary "one" or "zero."

In summary, the present invention relates to a shaped word current pulse which is applied to a drive line of a plated wire memory element which has a high amplitude leading edge and a lower amplitude trailing edge. The high amplitude leading edge of the word current pulse is utilized to read out the information stored in a particular bit position and the lower amplitude trailing edge is utilized in conjunction with positive or negative bit current to record either a binary "one" or binary "zero" into the same bit position. The use of a shaped word pulse as above described prevents creep in a plated wire memory device during a recording cycle and hence, the bit positions can be closely spaced to another. The close spacing of the bit positions permits the obtaining of a memory device having a high packing density.

Obviously, many modifications and variations of the present invention are possible in the light of the above teachings. It is therefore to be understood that within the scope of the appended claims, the invention may be practiced otherwise than as specifically described.

The embodiments of the invention in which an exclusive property or privilege is claimed are defined as follows:

1. A circuit arrangement providing: a memory element having two states of stable magnetic remanence adapted to be switched into either of said two states, said two states of remanence being representative of first and second recorded signals; means coupled to said memory element to generate a first current pulse having both a high and a low amplitude portion of the same polarity; read out means connected to said memory element responsive to said high amplitude portion of said first current pulse to determine whether said first or second signals is recorded on said memory element; means further connected to said memory element to generate a positive or negative current pulse in substantial time coincidence with said low amplitude portion of said first mentioned current pulse to record, respectively, said first or second signals on said memory element.

2. A circuit arrangement providing: a memory element having two states of stable magnetic remanence adapted to be switched into either of said two states, said two states of remanence being representative of first and second recorded signals; means coupled to said memory element to generate a first current pulse having a substantial leading edge overshoot and a lower amplitude trailing edge wherein said overshoot and lower amplitude are of the same polarity; read out means connected to said memory element responsive to said leading edge overshoot of said first current pulse to determine whether said first or second signals is recorded on said memory element; means further connected to said memory element to generate a positive or negative pulse in substantial time relationship with said lower amplitude trailing edge to record said first or second signals on said memory element.

3. A circuit arrangement providing: a memory element having two states of stable magnetic remanence and adapted to be switched into either of said two states, said two states of remanence being representative of first and second recorded signals, said memory element comprising the intersection of a magnetically plated wire incorporating a uniaxial anisotropy, and an orthogonally positioned drive line in juxtaposition to said plated wire; means connected to said drive line to generate a shaped current pulse wherein the amplitude of the leading edge of said current pulse is substantially greater than the amplitude of the trailing edge of said current pulse and both amplitudes are of the same polarity, said high amplitude portion of said current pulse being utilized to read out said first or second signals recorded on said memory element; means connected to said plated wire to generate either a positive or negative signal in substantial time relationship with said trailing edge of said shaped current pulse in order to record, respectively, said first or second signals on said memory element.

4. A circuit arrangement providing: a memory element having two states of stable magnetic remanence and adapted to be switched into either of said two states, said two states of remanence being representative of first and second recorded signals, said memory element comprising the intersection of a magnetically plated wire incorporating a uniaxial anisotropy, and an orthogonally positioned drive line in juxtaposition to said plated wire; a sense amplifier connected to said magnetically plated wires; means connected to said drive line to generate a shaped current pulse wherein the amplitude at the rise time of said pulse is substantially greater than the amplitude of the trailing edge of said pulse and both amplitudes are of the same polarity, said higher amplitude portion of said current pulse being utilized to read out said signal recorded on said memory element and said sense amplifier determining whether said first or second signal is recorded; means connected to said plated wire to generate either a positive or negative signal in substantial time relationship with said trailing edge of said current pulse in order to record said first or second signals on said memory element 5. A circuit arrangement providing: a signal conducting means having a thin magnetic film formed on the surface thereof, said thin magnetic film having a uniaxial anisotropy which establishes "easy" and "hard" directions of magnetization, said thin film having its magnetization vectors normally oriented in one of two equilibrium positions along said "easy" direction of magnetization in order to store, respectively, said first or second signals; a sensing means; a bit driver means to generate either a positive or negative current pulse, said signal conducting means being common connected to said bit driver and said sensing means; a drive line positioned in juxtaposition and orthogonally to said signal conducting means; means connected to said drive line to generate a shaped current pulse wherein the leading edge of said current pulse is substantially greater and of the same polarity as the amplitude of said trailing edge of said current pulse, said high amplitude leading edge energizing said drive line to read out said first or second signals as determined by said sense amplifier, said drive line when energized by said lower amplitude trailing edge of said current pulse in substantial time relationship with said positive or negative signal from said bit driver recording, respectively, said first or second signals on said memory element.

References Cited

UNITED STATES PATENTS

| | | | |
|---|---|---|---|
| 3,054,989 | 9/1962 | Melmed et al. ------ | 340—174 |
| 3,264,619 | 8/1966 | Riseman et al. ------ | 340—174 |
| 3,341,829 | 9/1967 | Meier ------------- | 340—174 |

BERNARD KONICK, *Primary Examiner.*

J. F. BREIMAYER, *Assistant Examiner.*